United States Patent [19]

Gavaskar

[11] Patent Number: 5,987,565
[45] Date of Patent: Nov. 16, 1999

[54] METHOD AND APPARATUS FOR VIRTUAL DISK SIMULATION

[75] Inventor: Vivek N. Gavaskar, Cupertino, Calif.

[73] Assignee: Sun Microsystems, Inc., Mountain View, Calif.

[21] Appl. No.: 08/882,094

[22] Filed: Jun. 25, 1997

[51] Int. Cl.[6] .............................. G06F 12/00; G06F 12/10
[52] U.S. Cl. .......................... 711/112; 711/171; 711/202; 709/301
[58] Field of Search .................................... 711/112, 171, 711/202; 709/301

[56] References Cited

U.S. PATENT DOCUMENTS 5,784,699  7/1998  McMahon et al. ...................... 711/171
5,845,297  12/1998  Grimsrud et al. ...................... 711/171

OTHER PUBLICATIONS

Krueger et al., "Tools for the Development of Application-Specific Virtual Memory Management", Proceedings of the eighth annual conference on Object–oriented programming systems, language, and applications; V 28, No. 10; pp. 48–64, Oct. 1993.

Primary Examiner—Reginald G. Bragdon
Attorney, Agent, or Firm—Blakely Sokoloff Taylor & Zafman

[57] ABSTRACT

A virtual disk simulator combines memory space from a given process address space in user space to form a virtual disk with contiguous memory space. The virtual disk may be accessed in the same manner as a physical hardware disk. The specific components of the virtual disk simulator are a virtual disk device driver in kernel space and a multi-threaded application running in user space. The virtual disk device driver supports the disk abstraction (e.g. simulation of the virtual disk having what appears to be unlimited disk space) and the multi-threaded application performs actual physical storage management in cooperation with the virtual disk device driver. The virtual disk device driver and the multi-threaded application interact using a special set of communication protocols.

23 Claims, 8 Drawing Sheets

| AREA # | START ADDRESS | LENGTH |
|---|---|---|
| 0 | 0x f0000 | 102400 |
| 1 | 0x 20000 | 698843 |
| ⋮ | | |
| | | |

METHOD AND APPARATUS FOR VIRTUAL DISK SIMULATION

BACKGROUND OF THE INVENTION (1) Field of the Invention

The present invention is in the field of storage devices, more specifically, the present invention is a method and an apparatus for virtual disk simulation.

(2) Related Art

Memory as related to a computer system is all of the addressable storage space in a processing unit and other internal storage that is used to execute instructions. A typical computer system has various sources of storage including it's own hard disk space, portable memory such as a floppy diskette and remote disk space accessed through a network. Remote disk space such as those accessible through a network may be made to appear as local storage through currently available memory management software including Network File Systems (NFS). Thus, current computer systems have virtually unlimited memory available to them and may support various requests for additional memory not available on its hard disk. However, a computer system can not support a request for a large contiguous disk space if all that is available is a collection of smaller local and remote individual disk storage units.

It is therefore desirable to have a method and an apparatus for applications running on a computer system to transparently access disk space which appears to the applications as being contiguous and in the size that is required by the applications.

BRIEF SUMMARY OF THE INVENTION

The present invention's virtual disk simulator allows user applications running on a computer system to access a virtual disk having a large contiguous memory. The virtual disk simulator combines memory space from a given process address space to form a virtual disk with contiguous memory space and may be accessed in the same manner as a physical hardware disk. The software application and the virtual disk device driver handling the simulation of the virtual disk may be based on Sun Microsystems®, Inc. of Mountain View, California's Solaris® Virtual Memory (VM) or any System V Release 4 (SVR4) compliant operating system. The specific components of the virtual disk simulator are a virtual disk device driver in kernel space and a multi-threaded application running in user space. The virtual disk device driver supports the disk abstraction (i.e. simulation of the virtual disk having what appears to be contiguous disk space) and the multi-threaded application performs the actual physical storage management in cooperation with the virtual disk device driver. The virtual disk device driver and the multi-threaded application of the present invention interact using a special set of communication protocols.

In one embodiment of the present invention, the virtual disk device driver is a pseudo-driver which complies to the Sun Microsystems®, Inc.'s Solaris® Device Driver Interface/Device Kernel Interface (DDI/DKI) specifications and is a loadable driver which supports the disk interface for the present invention's virtual disk. Further, the virtual disk device driver supports the virtual disk by implementing the standard interfaces for devices such as open, close, read, write, strategy and ioctl interfaces. The virtual disk device driver has no knowledge of the actual physical storage and is unable to interface with the memory management software (e.g. NFS, ISM/SM, UFS, etc.) in kernel space and hence, must rely on the multi-threaded application in user space for that portion of the overall responsibility in the virtual disk simulation.

The multi-threaded application manages the actual data storage belonging to the virtual disk and utilizes all the facilities provided by, for example, the Solaris® operating system by Sun Microsystems, Inc. or any System V Release 4 (SVR4) operating system to achieve the data management. The multi-threaded application is a user application which understands the protocol for communication with the virtual disk and has access to physical disk space which in turn is managed by memory management software components such as a disk driver (Small Computer System Interface (SCSI), etc.), a UNIX File System (UFS), an Network File System (NFS), a swapfs, an Intimate Shared Memory/Shared Memory (ISM/SM), a Temporary File System (tmpfs) and a Caching File System (cachefs).

A user application desiring to perform data input/output (I/O) with the present invention's virtual disk opens the virtual disk device driver through an open system call. The virtual disk device driver supports and honors the open system call by the user application. When the user application begins performing data I/O, the virtual disk device driver read, write, and strategy interfaces are called by the operating system. The virtual disk device driver acknowledges the data I/O request and transmits a message to the multi-threaded application running in user space regarding the request particulars, such as the size and location of the data to be transferred.

The multi-threaded application has mapped physical disk storage into it's own process address space and has a virtual disk table depicting a layout of the mapped physical disk storage. The multi-threaded application may easily correlate the data I/O request from the virtual disk device driver to the exact virtual disk space represented in the virtual disk table and hence translate the data I/O request to one of the available discrete disk spaces. When the multi-threaded application receives an acknowledgment from the physical disk space regarding the completion of the data I/O request, the multi-threaded application notifies the virtual disk device driver and the acknowledgment is passed onto the user application which initially generated the data I/O request.

There are numerous advantages and uses for the virtual disk simulation technology of the present invention. For example, the virtual disk simulation technology of the present invention allows the building of a single, contiguous disk illusion utilizing separate, discrete disk storage spaces. More specifically, the virtual disk simulation technology may be utilized where there is a demand for a single, large contiguous disk space and all that is available is a collection of smaller but numerous individual and possibly remote disk storage units. Additionally, since the virtual disk simulation technology of the present invention is capable of heavily utilizing all the system facilities in the virtual memory (VM) and virtual file system (VFS) space of memory in a given computer system, the virtual disk simulation technology may be utilized to test all the software layers in the VM and VFS space at the same time.

DETAILED DESCRIPTION OF THE INVENTION

The present invention's virtual disk simulator combines memory space from a given process address space to form a virtual disk with contiguous memory space. The present invention's virtual disk may be accessed in the same manner as a physical hardware disk. The multi-threaded application and the virtual disk device driver handling the simulation of the virtual disk may be based on Sun Microsystems®, Inc. of Mountain View, California's Solaris® Virtual Memory (VM) or any System V Release 4 (SVR4) compliant operating system. The specific components of the virtual disk simulator are a virtual disk device driver in kernel space and a multi-threaded application running in user space. The virtual disk device driver supports the disk abstraction (e.g. simulation of the virtual disk having what appears to be contiguous disk space) and the multi-threaded application performs the actual physical storage management in cooperation with the virtual disk device driver. The virtual disk device driver and the multi-threaded application of the present invention interact using a special set of communication protocols.

The access to discrete memory space by the multi-threaded application is completely transparent to user application's performing data input/output (I/O) request to the virtual disk device driver. Hence, it appears to the user applications that the virtual disk device driver is servicing the data I/O request requiring a large contiguous disk space through the virtual disk only.

Figure 1:
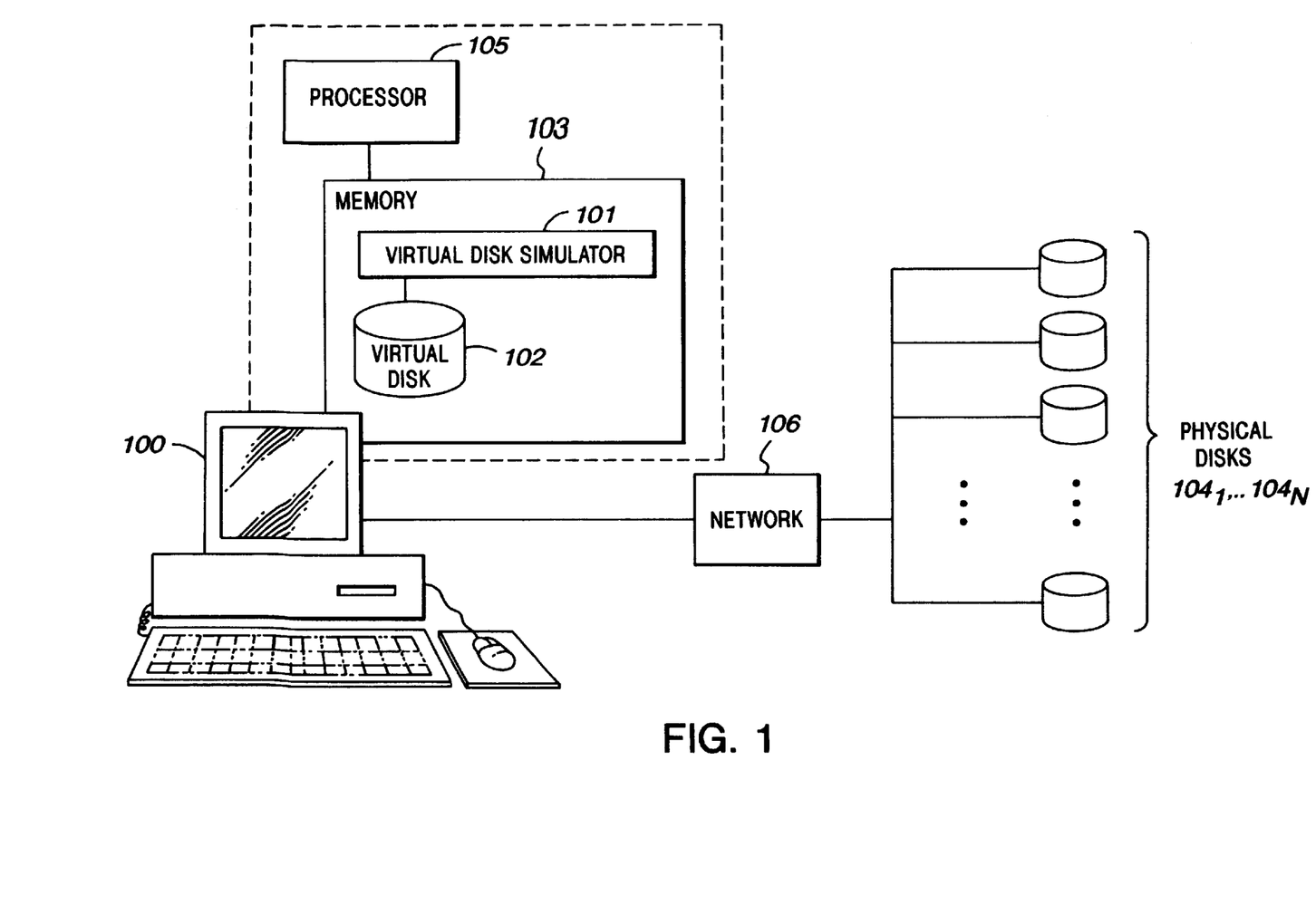
FIG. 1 illustrates an exemplary system with the implementation of the present invention's virtual disk simulator.

FIG. 1 illustrates an exemplary system with the implementation of the present invention's virtual disk simulator. Virtual disk simulator 101 manages discrete, distributed disk space, giving a user application the view of a single, contiguous disk space. Computer system 100 has memory 103 coupled to processor 105. Memory 103 contains the present invention's virtual disk simulator 101 simulating virtual disk 102 having the disk space of physical disks $104_1$ to $104_N$ accessed through network 106. Physical disks $104_1$ to $104_N$ may independently exist in separate computer systems.

Figure 2A:
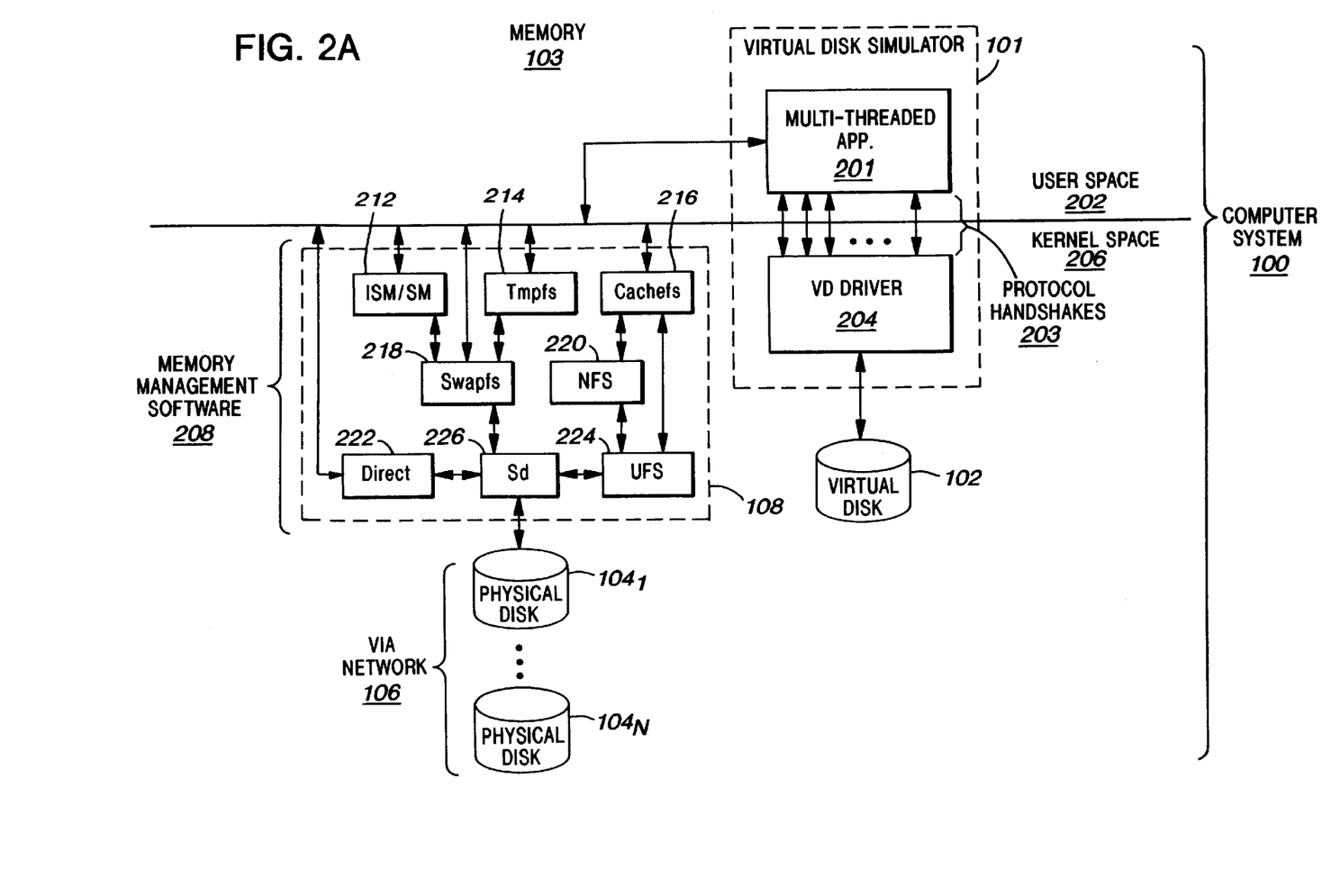
FIG. 2a illustrates an exemplary virtual disk architecture of the present invention.

FIG. 2a illustrates an exemplary virtual disk architecture of the present invention. The present invention's virtual disk simulator 101 has two components.

One component is multi-threaded application 201 which is a software application that performs the actual physical storage management of physical disks $104_1$ to $104_N$ and resides in user space 202. User space is the area of storage in a computer system memory used for execution of user programs. Multi-threaded application 201 is a user application which understands the protocols for communication with virtual disk device driver 204. Further, multi-threaded application 201 has access to physical disk space which is in turn managed by memory management software 208.

Multi-threaded application 201 manages the actual data storage belonging to virtual disk 102 and utilizes all the facilities provided by an operating system such as Sun Microsystems, Inc. of Mountain View, California's Solaris® or any SVR4 operating system, to achieve the data management. Multi-threaded application 201 and virtual disk device driver 204 utilize handshake protocols to exchange data between them.

The other component is virtual disk device driver 204 which defines virtual disk 102 and resides in kernel space 206. Kernel space is the area of an operating system which performs basic functions such as allocating hardware resources.

Virtual disk device driver 204 supports virtual disk 102 by implementing the standard interfaces for devices such as open, close, read, write, strategy and ioctl interfaces. Virtual disk device driver 204 has no knowledge of actual physical storage and hence must rely on multi-threaded application 201 for the management related to the actual physical storage.

There are multiple threads interfacing multi-threaded application 201 and virtual disk device driver 204. The multiple threads allow a special communication protocol to interface multi-threaded application 201 and virtual disk device driver 204. Once virtual disk device driver 204 defines a virtual disk 102, virtual disk device driver 204 signals multi-threaded application 201 to retrieve necessary hard disk space through network 106. Multi-threaded application 201 then interfaces with a plurality of memory management software 208. Such memory management software includes Intimate Shared Memory/Shared Memory (ISM/SM) 212, Temporary File System (tmpfs) 214, Caching File System (cachefs) 216, Swap File System (swapfs) 218, Network File System (NFS) 220, direct 222, UNIX File System (UFS) 224 and SCSI disk 226.

Intimate Shared Memory (ISM)/Shared Memory (SM) 212 allows programs to share memory. Tmpfs 214 is a temporary file system which manages temporary data. Cachefs 216 manages data cached in cache memory for frequent access. Swapfs 218 makes memory space available for data which currently needs to be accessed. Network File System (NFS) 220 provides the illusion that any disk space available in the network is actually locally available. Direct 222 allows direct access to a physical disk. UNIX file system (UFS) 224 is a default file system which allows management of disk space. SCSI disk (SD) 226 is an example of a device driver allowing access to physical disks. The various exemplary memory management software 208 are well known in the art.

The arrows between multi-threaded application 201 and virtual disk device driver 204 are protocol handshakes 203 allowing the two to communicate with each other. Virtual disk device driver 204 and virtual disk 102 communicate with each other through ioctl (input/output control) calls such as open, read, close and write calls.

Any user application wishing to perform data I/O with virtual disk 102 opens virtual disk driver 204 through an open system call. Virtual disk device driver 204 supports the open system call. When the user application begins performing data I/O requests (e.g. read back/write back/iseek I/O), virtual disk device driver 204 read, write and strategy interfaces are called by the operating system (not shown). In response to the data I/O request, virtual disk device driver 204 transmits a message to multi-threaded application 201 running in user address space regarding the request particulars such as the size and location of the data to be transferred.

Multi-threaded application 201 has mapped physical disk storage into the process address space and has a virtual disk table (illustrated in FIG. 2b) depicting the layout. Multi-threaded application 201 correlates the input/output request from virtual disk device driver 204 to the exact disk space as represented in the table and translates the request to one of the discrete disk spaces (e.g. physical disks $104_1$ through $104_N$). When multi-threaded application 201 receives acknowledgment from the physical disk space regarding the completion of the translated data I/O request, multi-threaded application 201 notifies virtual disk device driver 204 and the acknowledgment is passed onto the user application which generated the data I/O request in the first place.

Figure 2B:
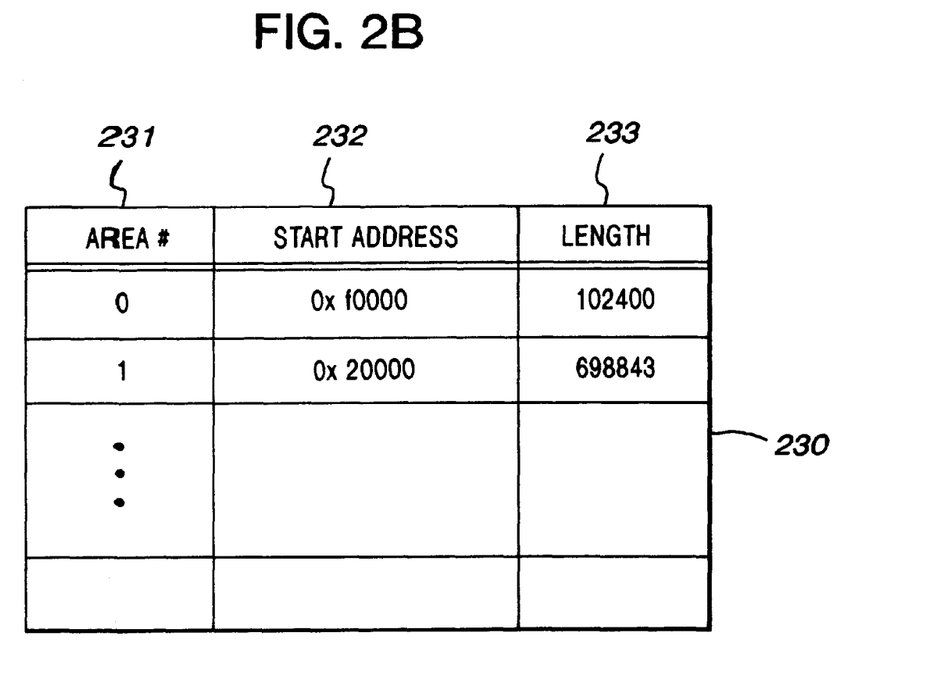
FIG. 2b illustrates an exemplary virtual disk table depicting the memory layout of the physical disk storage mapped into the process address space of the multi-threaded application.

FIG. 2b illustrates an exemplary virtual disk table depicting the memory layout of the physical disk storage mapped into the address space of the multi-threaded application. Virtual disk table 230 has area number 231 and start address 232 referencing the address in the multi-threaded application's process address space in user space where the physical disk space is mapped into and length 233 indicating the size of the memory mapped space. Given a user application data I/O request, the multi-threaded application performs a look-up to the table and selects one or more area 231's from table 230 with the total length 233 which matches the data I/O request.

Figure 3:
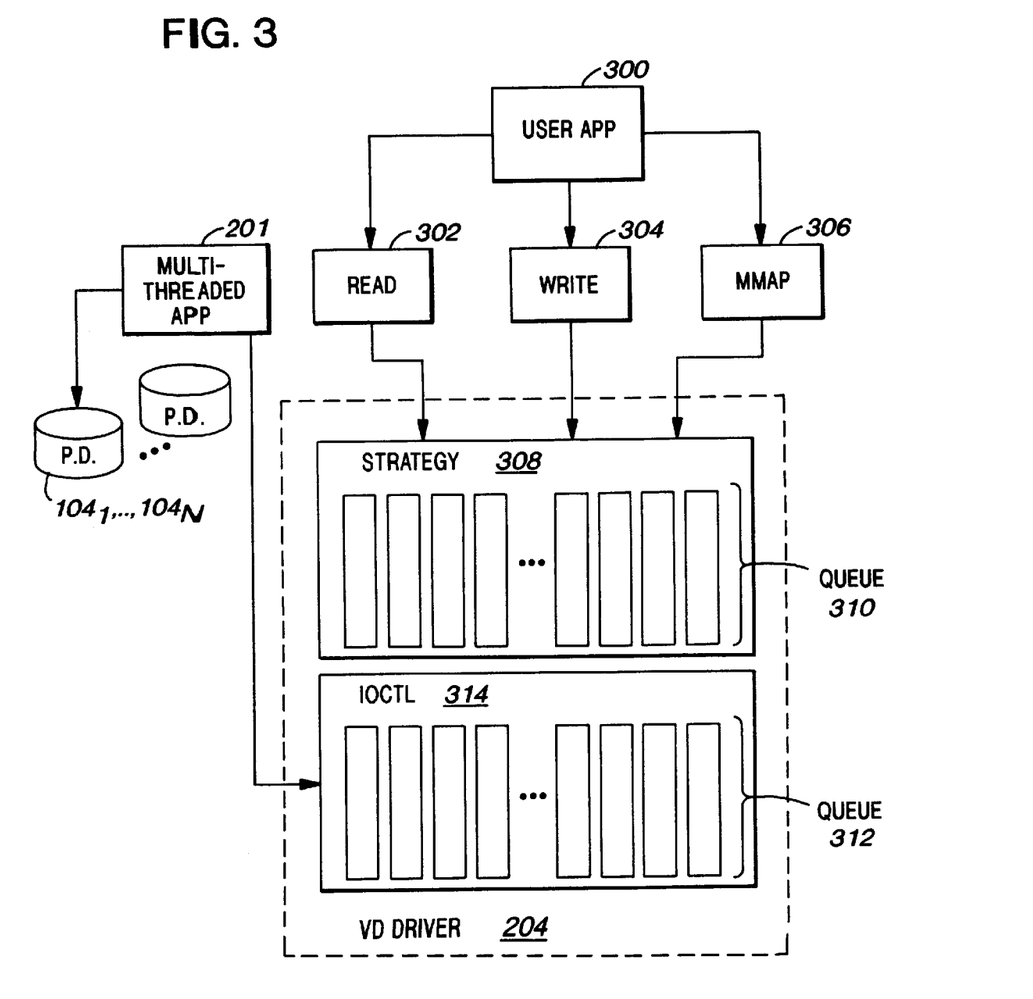
FIG. 3 illustrates an exemplary protocol handshake used between the virtual disk device driver and the multi-threaded application.

FIG. 3 illustrates the protocol handshake between the virtual disk device driver and the multi-threaded application.

Virtual disk device driver 204 has multiple entrances allowing software applications to access the virtual disk coupled to the virtual disk device driver 204. For example, user application 300 may access virtual disk device driver 204 through read call 302, write call 304 or memory mapped call (MMAP) 306 to strategy routine 308 of virtual disk device driver 204. Once an access is made by user application 300, the access call is placed in queue 310 of strategy routine 308.

Multi-threaded application 201 has access to the physical disk storage through standard memory management software. Further, multi-threaded application 201 has access to virtual disk device driver 204 through virtual disk device driver 204's ioctl routine 314 also comprised of multiple queues 312. Once a request for access to the virtual disk is made by user application 300 and placed in queue 310 of strategy routine 308, multi-threaded application 201 retrieves the user I/O request from queue 310 and places it on ioctl routine 314's queue 312. If user application 300 made a write call 304, then the write data placed in strategy routine 308's queue 310 is retrieved and placed on ioctl routine 314's queue 312. Multi-threaded application 201 then takes the data and writes the data to the appropriate space in physical disk $104_1$ through $104_N$. If user application 300 made a read call 302, then multi-threaded application 201 retrieves the data from physical disk $104_1$ through $104_N$ and placed in queue 312 of ioctl routine 314. The data is then retrieved from queue 312 and placed in strategy routine 308's queue 310 and forwarded to user application 300.

Figure 4A:
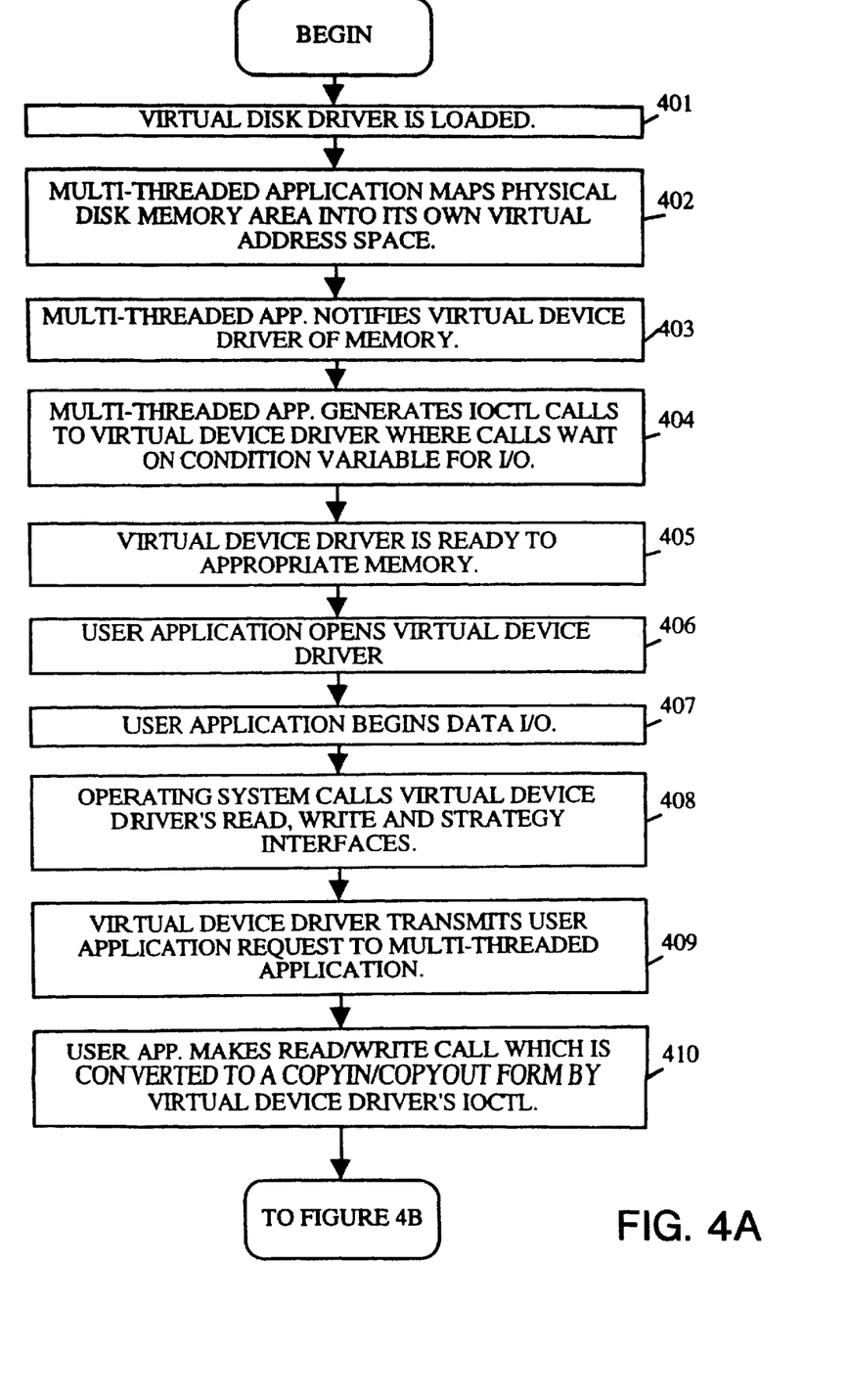
FIGS. 4a and 4b are flow diagrams illustrating the general steps followed by the virtual disk simulator of the present invention.
Figure 4B:
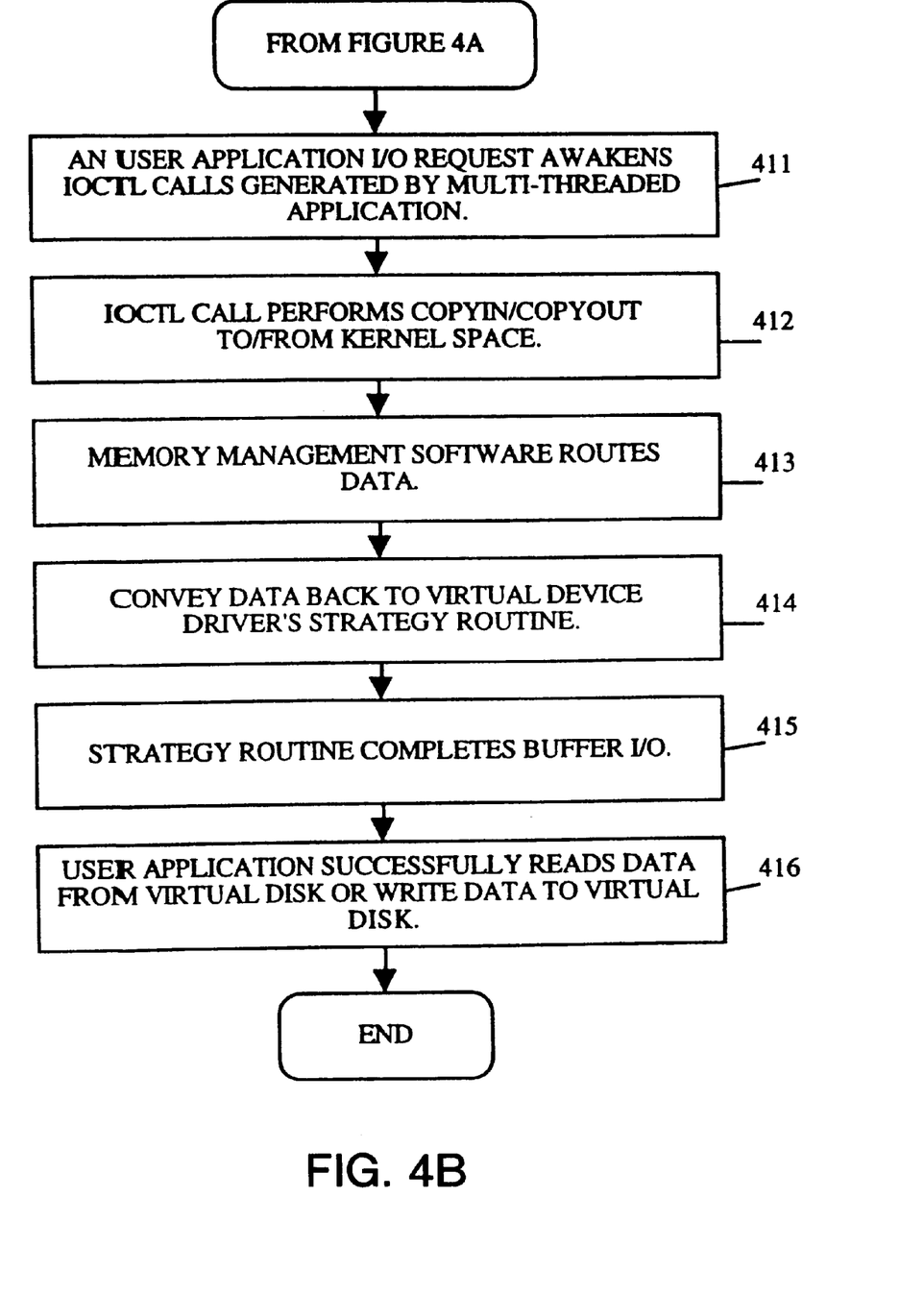

FIGS. 4a and 4b are flow diagrams illustrating the general steps followed by the virtual disk simulator of the present invention. In step 401, the virtual disk driver is loaded into a computer system. In step 402, the multi-threaded application maps physical disk memory area into its own process address space in user space. The multi-threaded application also has a virtual disk table (as was illustrated in FIG. 2b) depicting the layout. The memory location can be disk partitions from local disks, regular files in local file systems or network file system (NFS) mounted remote file systems, shared memory area in process address space, space on processed stack or heap and any other memory area which can be mapped into the multi-threaded application's process address space.

In step 403, once the process of mapping is completed by the multi-threaded application, the multi-threaded application informs the virtual disk device driver regarding the available virtual memory area, the starting addresses and the respective lengths of the memory available. In step 404, the multi-threaded application spawns a number of threads, each making an ioctl call to the virtual disk device driver. The ioctl calls are placed in the virtual disk device driver's ioctl routine queues to wait on a condition variable for data I/O action. In step 405, the virtual disk device driver is ready to route transfer data to appropriate areas depending on the offset and length of information given by the multi-threaded application.

In step 406, any user application in the user space wishing to perform data I/O with the virtual disk opens the virtual disk driver using an open system call. In step 407, the virtual disk driver supports the open system call by the user application. When the user application begins performing the data I/O (read/write), the virtual disk device driver's read, write and strategy interfaces are called by the operating system in step 408. In step 409, the virtual disk device driver understands the data I/O request and transmits the message to the multi-threaded application running in user address space regarding the request particulars such as the size and location of data involved in the data I/O request.

In step 410, the virtual disk device driver's strategy routine converts the data I/O request into a copy in or a copy out form using standard DDI/DKI routines, sets up the kernel data structures for I/O accordingly and places a strategy thread in the strategy queue.

In step 411, virtual disk device driver then sets the condition variable for an actual data I/O and the user application I/O request is converted into a copy in or a copy out form by the strategy routine. The ioctl call in ioctl queues waiting on that condition variable of data I/O action is activated. In step 412, the activated ioctl call looks at the data I/O request converted into a copy in or a copy out form by the strategy routine and performs a copy in or a copy out of the physical disk memory mapped to or from the multi-threaded application's process address space using the virtual disk table. In step 313, the memory management software (e.g. ISM/SM, NFS, etc.) actually routes the data to or from the physical disks.

In step 414, the ioctl routine conveys the result in the form of an acknowledgment of a data write to the physical disks or actual returned data from the physical disks for a data read performed in response to the user application's data I/O request. The result is conveyed back to the strategy routine which is in the strategy routine's queues. In step 415, the strategy routine completes the buffer I/O by transmitting the result back to the user application and informs the computer system regarding the data transfer and the operation is complete. In step 416, the user application accessing the virtual disk either receives the data from the virtual disk through the virtual disk device driver or is successful in writing data to the virtual disk.

The access to the discrete physical disk space by the multi-threaded application through the memory management software as described above is completely transparent to the user application initiating the data I/O request. The user application deals directly with the virtual disk device driver which is a device driver for the virtual disk in initiating its data I/O request and in receiving results back in response to its data I/O request. Thus to the user application, a virtually unlimited contiguous source of memory space is made available through the virtual disk device driver's access to a "virtual disk".

The present invention's virtual disk simulator has numerous applications. One obvious application is to provide a computer system with contiguous memory space. Since the virtual disk simulator allows the building of a single contiguous disk illusion utilizing separate discrete disk storage space, the technology may be used where there is demand for a single, large contiguous disk space and what is available is a collection of smaller but numerous individual and potentially discrete disk storage units.

Another application of the present invention's virtual disk simulator is in testing system software. Since the virtual disk simulator of the present invention heavily utilizes all the system facilities in virtual memory (VM) and virtual file system (VFS) space, the virtual disk simulator may be utilized to test all the software layers in the VM and VFS areas.

Figure 5:
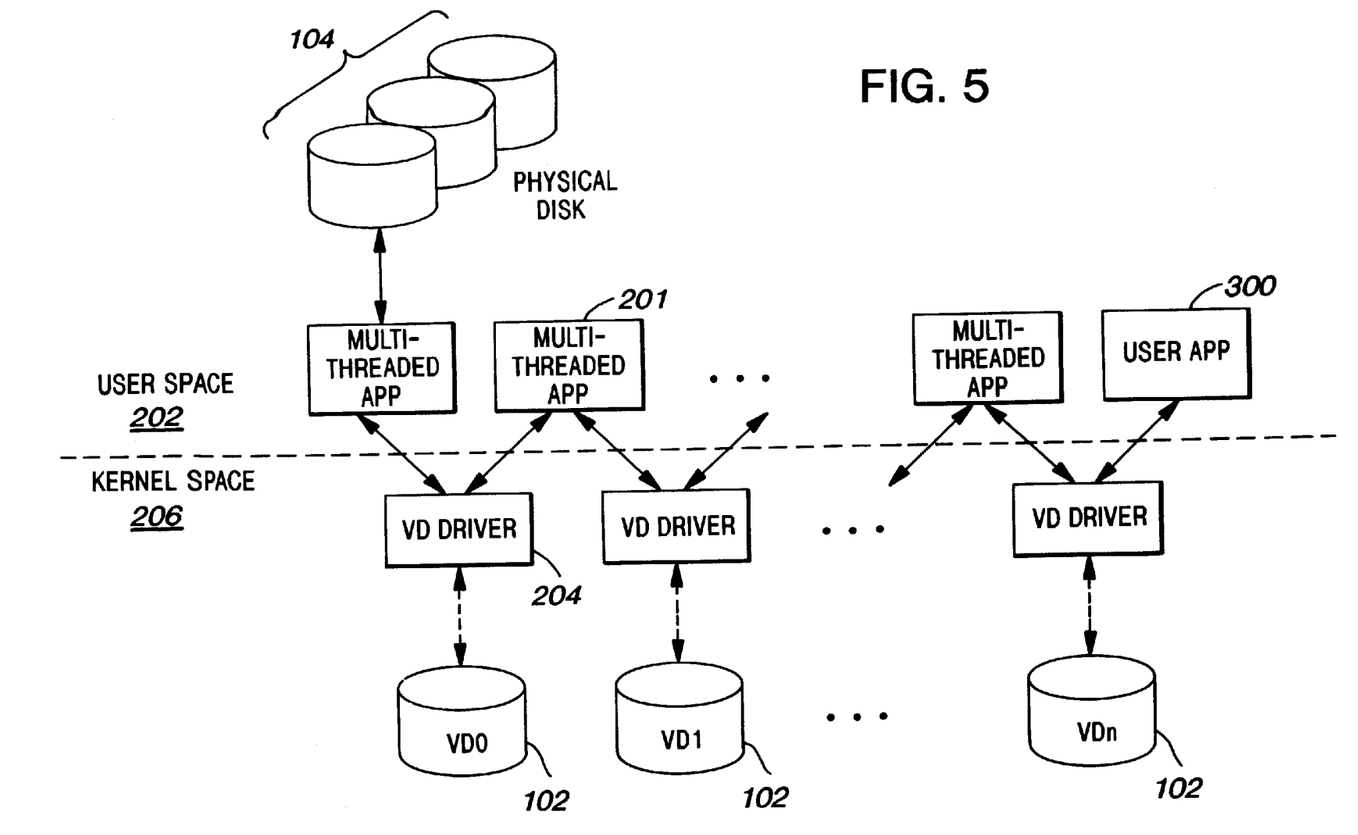
FIG. 5 illustrates the usage of virtual disk simulation technology in testing of an operating system software.

FIG. 5 illustrates the usage of virtual disk simulation technology in testing of an operating system software. More specifically, multiple virtual disks 102's, multiple virtual disk device drivers 204's and virtual device applications 201's are coupled to each other in sequence such that a user application 300 attempting to access storage for a read or write operation begins a sequence of access through each and every one of the virtual disks. The data I/O request moves between kernel and user space in a zigzag fashion stressing the capabilities of the system data transfer and memory management facilities. A tremendous amount of stress is generated on the system due to the sheer number of the virtual disks, the applications and the device drivers through which the data I/O request must go through before reaching physical storage 104. The test is advantageous in that the test allows simultaneous stress on VM/VFS subsystems.

Figure 6:
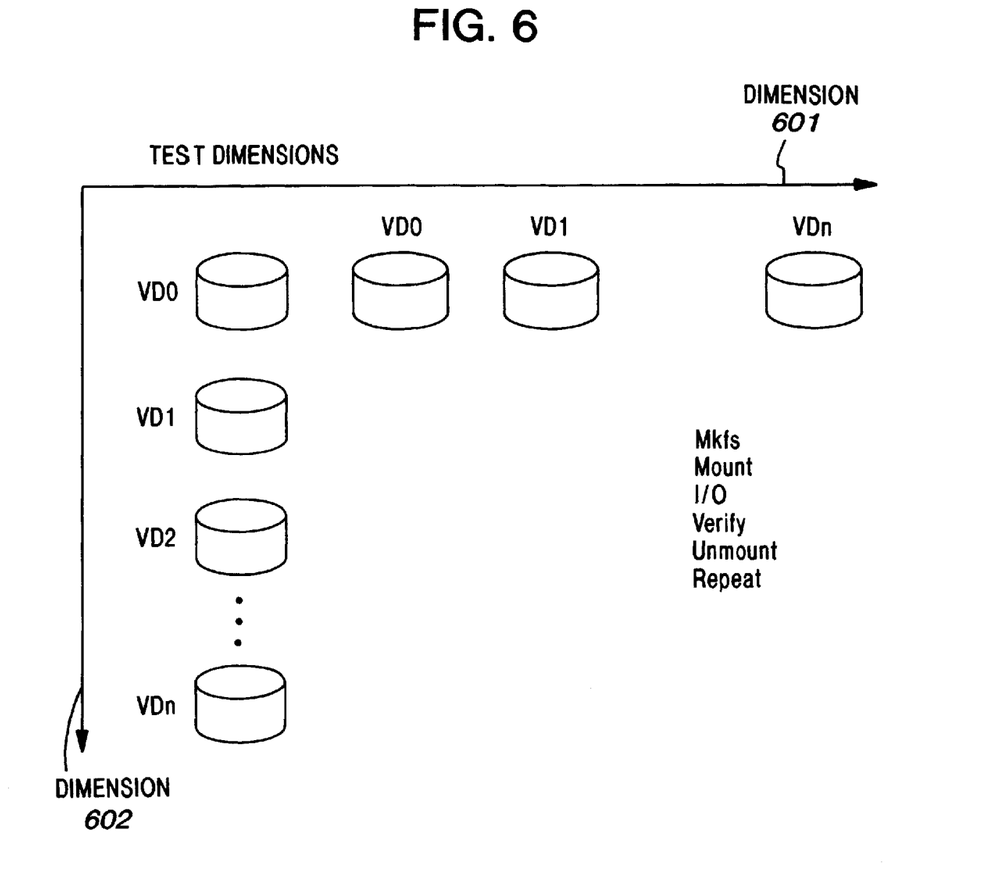
FIG. 6 illustrates an exemplary application of the present invention's virtual disk simulator.

FIG. 6 illustrates yet another application of the present invention. More specifically, FIG. 6 illustrates the total test space for a virtual disk simulation technology of the present invention. The multi-threaded application can access physical data with the help of six memory management software components: UFS, NFS, swapfs, tmpfs, cachefs, and ISM/SM. There are approximately sixty-three $$\sum_{i=1}^{i=6} C_i^6 = 6^3$$

combinations where i is index 1 to 6 and C is the combination) ways in which the memory management software components may be combined to support one virtual disk.

Additionally, the system may be tested using multiple virtual disks residing on the same system and the arrangements are orthogonal. In one direction in dimension 601, the virtual disks are not inter-related. On the other hand, in dimension 602 virtual disks may be created utilizing other virtual disks. A test may be positioned anywhere in the space defined by these two axes and can be composed in sixty-three different ways. The exemplary test may determine system software quality.

What has been described is a method and an apparatus for a virtual disk simulation which combines memory space from a given process address space to form a virtual disk with contiguous memory space. The present invention's virtual disk may be accessed in the same manner as a physical hardware disk. The specific components of the virtual disk simulator are a virtual disk device driver running in kernel space and a multi-threaded application running in user space. The virtual disk device driver supports the disk abstraction (e.g. simulation of the virtual disk having what appears to be contiguous disk space) and the multi-threaded application performs the actual physical storage management in cooperation with the virtual disk device driver. The virtual disk device driver and the multi-threaded application of the present invention interact using a special set of communication protocols.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for providing contiguous disk space in a computer system comprising the steps of:
   requesting access to a virtual disk by a data input/output (I/O) request made by a user application to a virtual disk device driver in kernel space and requiring contiguous memory space of a predetermined size;
   requesting access to a plurality of disk memory spaces with a combined size capable of servicing said data I/O request, said disk memory space request being made by said virtual disk device driver in kernel space to a multi-threaded application in user space, said request being transparent to said user application; and
   providing said virtual disk device driver with access to said plurality of disk memory space to allow said virtual disk device driver to service said user application's data I/O request.

2. The method of claim 1 wherein said step of providing further comprises the step of retrieving a physical disk address of a data block in said plurality of disk memory space in response to said request of said virtual disk device driver.

3. The method of claim 2 wherein said step of retrieving further comprises the step of mapping said plurality of disk memory space into a multi-threaded application process address space.

4. The method of claim 3 further comprising the step of notifying said virtual disk device driver of memory available in said multi-threaded application process address space as said virtual disk having contiguous memory space.

5. The method of claim 4 further comprising the step of opening said virtual disk device driver for input/output call (ioctl), said step of opening being performed by said user application.

6. The method of claim 5 further comprising the step of initiating data I/O through said virtual disk device driver through said ioctl call.

7. The method of claim 6 further comprising the step of transmitting said data I/O request to said multi-threaded application.

8. The method of claim 7 further comprising the step of generating ioctl calls to said virtual disk device driver, said ioctl calls being generated by said multi-threaded application, said ioctl calls waiting on a condition variable of said user application's data I/O request.

9. The method of claim 8 further comprising the step of converting said user application's data I/O request into a copy in or copy out form.

10. The method of claim 8 wherein said ioctl calls transfer requested data to and from kernel space in accordance to said user application's data I/O request.

11. The method of claim 10 further comprising the step of routing said requested data to said virtual disk device driver from said plurality of disk memory space through said multi-threaded application using memory management software.

12. The method of claim 11 further comprising the step of transmitting said requested data to said user application.

13. The method of claim 10 further comprising the step of routing said requested data from said virtual disk device driver to said plurality of disk memory space through said multi-threaded application using memory management software.

14. The method of claim 13 further comprising the step of writing said requested data to said plurality of disk memory space.

15. An apparatus for generating contiguous disk memory space, including code configured for storage on a computer-readable apparatus and executable by a computer, the code including a plurality of modules each configured to carry out at least one function to be executed by the computer, the apparatus comprising:
- a virtual disk device driver module in kernel space configured to accept user application data input/output (I/O) request requiring contiguous memory space of a predetermined size; and
- a multi-threaded application module in user space configured to accept requests by said virtual disk device driver module to access a plurality of disk memory spaces which combined size is capable of servicing said data I/O request and accessing said plurality of disk memory spaces in response to said request by said virtual disk device driver module, said multi-threaded application module coupled to said virtual disk device driver module.

16. The apparatus of claim 15 wherein said virtual disk device driver module further comprises data interface elements.

17. The apparatus of claim 15 wherein said data interface elements further comprises a strategy interface and an I/O control interface configured to accept said user application data I/O request for data I/O with said virtual disk.

18. The apparatus of claim 17 further comprising a user thread configured to activate said user application data I/O request.

19. The apparatus of claim 15 wherein said multi-threaded application module further comprises a virtual disk table having a map of said plurality of disk memory spaces accessible as said virtual disk.

20. A system for generating contiguous disk memory space, including code configured for storage on a computer-readable apparatus and executable by a computer, the code including a plurality of modules each configured to carry out at least one function to be executed by the computer, the system comprising:
- the computer-readable medium which contains,
  - a virtual disk device driver module in kernel space configured to accept a user application data input/output (I/O) request requiring contiguous memory space of a predetermined size; and
  - a multi-threaded application module in user space configured to accept requests by said virtual disk device driver module to access a plurality of disk memory space which combined size is capable of servicing said data I/O request and accessing said plurality of disk memory spaces in response to said request by said virtual disk device driver module, said multi-threaded application module coupled to said virtual disk device driver module; and
- a processor for driving said virtual disk device driver module and said multi-threaded application module, said processor coupled to said computer-readable medium.

21. The system of claim 20 wherein said virtual disk device driver module further comprises data interface elements.

22. The system of claim 20 wherein said data interface elements further comprises a strategy interface and an I/O control interface configured to accept said user application data I/O request for data I/O with said virtual disk.

23. The system of claim 20 wherein said multi-threaded application module further comprises a virtual disk table having a map of said plurality of disk memory spaces accessible as said virtual disk.

* * * * *